(12) United States Patent
Radinsky

(10) Patent No.: US 12,615,158 B2
(45) Date of Patent: Apr. 28, 2026

(54) TECHNIQUES FOR EFFICIENT DATA CATEGORIZATION

(71) Applicant: UNITEDHEALTH GROUP, INCORPORATED, Minnetonka, MN (US)

(72) Inventor: Moshe Daniel Radinsky, West Hempstead, NY (US)

(73) Assignee: UNITEDHEALTH GROUP, INCORPORATED, Minnetonka, MN (US)

( * ) Notice: Subject to any disclaimer, the term of this patent is extended or adjusted under 35 U.S.C. 154(b) by 69 days.

(21) Appl. No.: 18/634,565

(22) Filed: Apr. 12, 2024

(65) Prior Publication Data

US 2025/0323797 A1     Oct. 16, 2025

(51) Int. Cl.
*G06F 16/00* (2019.01)
*H04L 9/32* (2006.01)
(52) U.S. Cl.
CPC ................................. H04L 9/3247 (2013.01)
(58) Field of Classification Search
CPC .................................................... H04L 9/3247
USPC ...................................................... 707/600
See application file for complete search history.

(56) References Cited

U.S. PATENT DOCUMENTS

| | | | |
|---|---|---|---|
| 7,685,006 B2 | 3/2010 | Rahn et al. | |
| 7,979,382 B2 | 7/2011 | Guyan et al. | |
| 8,843,435 B1 | 9/2014 | Trefler et al. | |
| 9,330,109 B2 | 5/2016 | Bone et al. | |
| 11,328,365 B2 * | 5/2022 | Tabak .................... | G16H 15/00 707/707 |
| 11,783,927 B2 | 10/2023 | Jones et al. | |
| 2012/0143634 A1 | 6/2012 | Beyda et al. | |
| 2015/0127370 A1 | 5/2015 | Cornelis | |
| 2023/0103143 A1 | 3/2023 | Srinivasan et al. | |
| 2024/0275608 A1 * | 8/2024 | Cook .................... | H04L 9/3247 707/707 |

* cited by examiner

*Primary Examiner* — Alexandria Y Bromell
(74) *Attorney, Agent, or Firm* — MARSHALL, GERSTEIN & BORUN LLP

(57) ABSTRACT

Techniques for efficient data categorization are disclosed herein. An example computer-implemented method includes receiving (i) a data set including a plurality of data points that each include at least one data line and (ii) a rule group including a plurality of rules and a plurality of rule sets. The example method further includes applying a categorization algorithm to the data set and the rule group that includes: generating a rule signature for each data line in each data point, identifying a set of unique rule signatures within the generated rule signatures, and determining a categorization for each unique rule signature of the set of unique rule signatures. The example method further includes storing a data object indicative of the determined categorizations.

20 Claims, 5 Drawing Sheets

FIG. 4

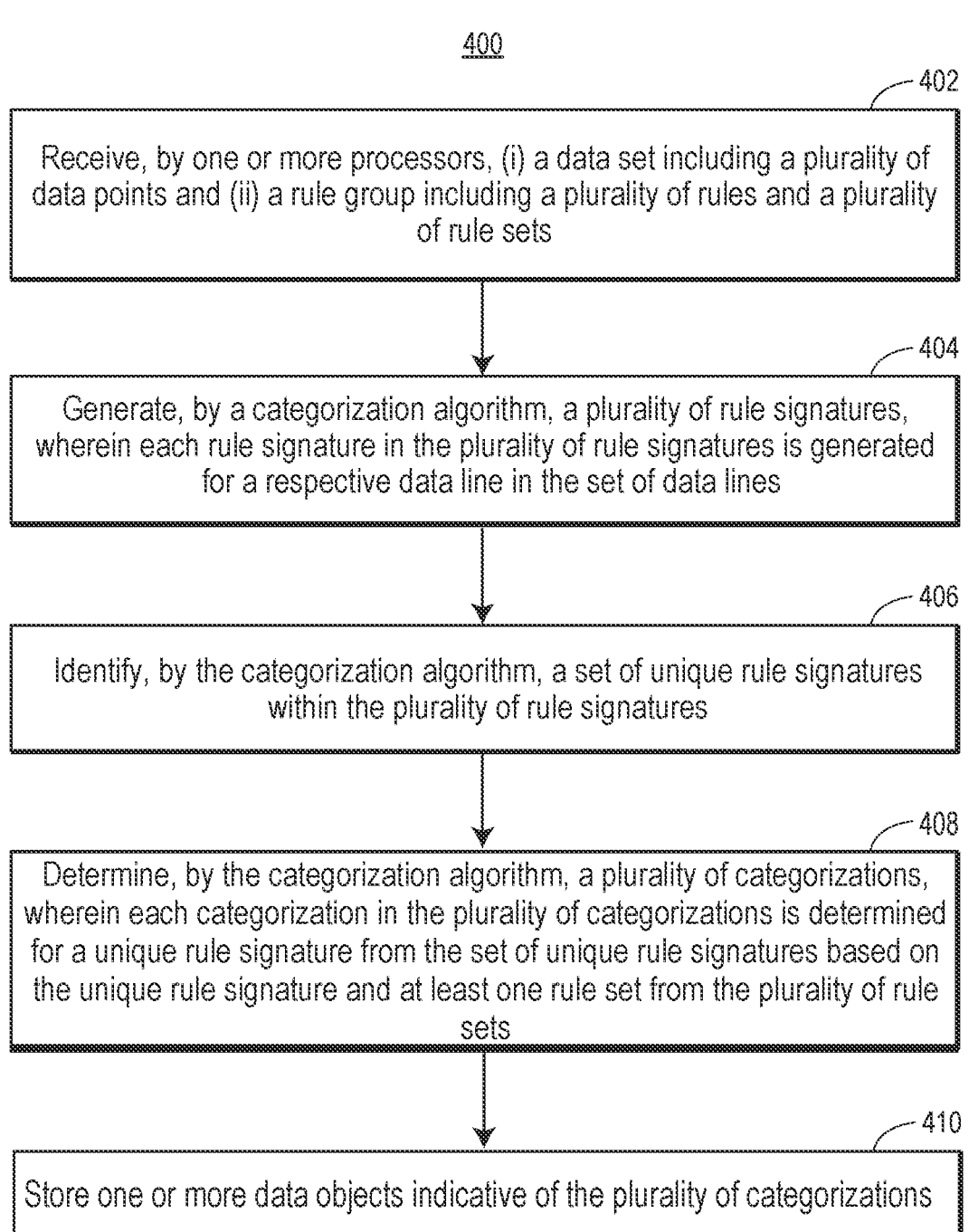

400

402

Receive, by one or more processors, (i) a data set including a plurality of data points and (ii) a rule group including a plurality of rules and a plurality of rule sets

404

Generate, by a categorization algorithm, a plurality of rule signatures, wherein each rule signature in the plurality of rule signatures is generated for a respective data line in the set of data lines

406

Identify, by the categorization algorithm, a set of unique rule signatures within the plurality of rule signatures

408

Determine, by the categorization algorithm, a plurality of categorizations, wherein each categorization in the plurality of categorizations is determined for a unique rule signature from the set of unique rule signatures based on the unique rule signature and at least one rule set from the plurality of rule sets

410

Store one or more data objects indicative of the plurality of categorizations

TECHNIQUES FOR EFFICIENT DATA CATEGORIZATION

TECHNICAL FIELD

The present disclosure generally relates to data categorization techniques, and more particularly, to determining rule clusters applicable to multiple data points to facilitate determining categorizations of the data points and causing the categorizations to be displayed.

BACKGROUND

Data categorization is a nearly ubiquitous requirement of data processing and storage for industries worldwide. Effective categorization techniques save processing time and/or processing resources, and can in some cases increase accuracy of subsequent analysis involving the categorized data. However, conventional categorization techniques are generally inadequate for efficiently categorizing large data sets (e.g., billions of values for analysis). More specifically, conventional categorization techniques applied to such large data sets perform approximately as many calculations as the number of values for analysis, and often orders of magnitude more.

Therefore, in general, efficient data categorization is an area of great interest, and conventional techniques can be insufficient for providing such efficient categorization for large data sets. Accordingly, a need exists for techniques that provide users with efficient data categorization of large data sets that mitigate the negative effects stemming from computationally intensive conventional techniques.

SUMMARY

In some aspects, a computer-implemented method includes receiving, by one or more processors, (i) a data set including a plurality of data points and (ii) a rule group including a plurality of rules and a plurality of rule sets, wherein each data point in the plurality of data points includes one or more data lines, and wherein all of the one or more data lines in the plurality of data points collectively form a set of data lines. The computer-implemented method further includes applying, by the one or more processors, a categorization algorithm to the data set and the rule group. Applying the categorization algorithm includes generating a plurality of rule signatures, wherein each rule signature in the plurality of rule signatures is generated for a respective data line in the set of data lines, and wherein the rule signature represents at least one rule from the plurality of rules that is satisfied by the respective data line, identifying a set of unique rule signatures within the plurality of rule signatures, and determining a plurality of categorizations, wherein each categorization in the plurality of categorizations is determined for a unique rule signature from the set of unique rule signatures based on the unique rule signature and at least one rule set from the plurality of rule sets. The computer-implemented method further includes storing, by the one or more processors, one or more data objects indicative of the plurality of categorizations.

In some aspects, a system includes memory and one or more processors communicatively coupled to the memory. The one or more processors are configured to receive (i) a data set including a plurality of data points and (ii) a rule group including a plurality of rules and a plurality of rule sets, wherein each data point in the plurality of data points includes one or more data lines, and wherein all of the one or more data lines in the plurality of data points collectively form a set of data lines. The one or more processors are further configured to apply a categorization algorithm to the data set and the rule group. Applying the categorization algorithm includes generating a plurality of rule signatures, wherein each rule signature in the plurality of rule signatures is generated for a respective data line in the set of data lines, and wherein the rule signature represents at least one rule from the plurality of rules that is satisfied by the respective data line, identifying a set of unique rule signatures within the plurality of rule signatures, and determining a plurality of categorizations, wherein each categorization in the plurality of categorizations is determined for a unique rule signature from the set of unique rule signatures based on the unique rule signature and at least one rule set from the plurality of rule sets. The one or more processors are further configured to store one or more data objects indicative of the plurality of categorizations.

In some aspects, one or more non-transitory computer-readable storage media include instructions that, when executed by one or more processors, cause the one or more processors to receive (i) a data set including a plurality of data points and (ii) a rule group including a plurality of rules and a plurality of rule sets, wherein each data point in the plurality of data points includes one or more data lines, and wherein all of the one or more data lines in the plurality of data points collectively form a set of data lines. The instructions, when executed, further cause the one or more processors to apply a categorization algorithm to the data set and the rule group. Applying the categorization algorithm includes generating a plurality of rule signatures, wherein each rule signature in the plurality of rule signatures is generated for a respective data line in the set of data lines, and wherein the rule signature represents at least one rule from the plurality of rules that is satisfied by the respective data line, identifying a set of unique rule signatures within the plurality of rule signatures, and determining a plurality of categorizations, wherein each categorization in the plurality of categorizations is determined for a unique rule signature from the set of unique rule signatures based on the unique rule signature and at least one rule set from the plurality of rule sets. The instructions, when executed, further cause the one or more processors to store one or more data objects indicative of the plurality of categorizations.

BRIEF DESCRIPTION OF THE DRAWINGS

The Figures described below depict preferred embodiments for purposes of illustration only. One skilled in the art will readily recognize from the following discussion that alternative embodiments of the systems and methods illustrated herein may be employed without departing from the principles of the disclosure described herein.

FIG. 4 depicts a flow diagram representing an example computer-implemented method, in accordance with various embodiments described herein.

DETAILED DESCRIPTION

Figure 1:
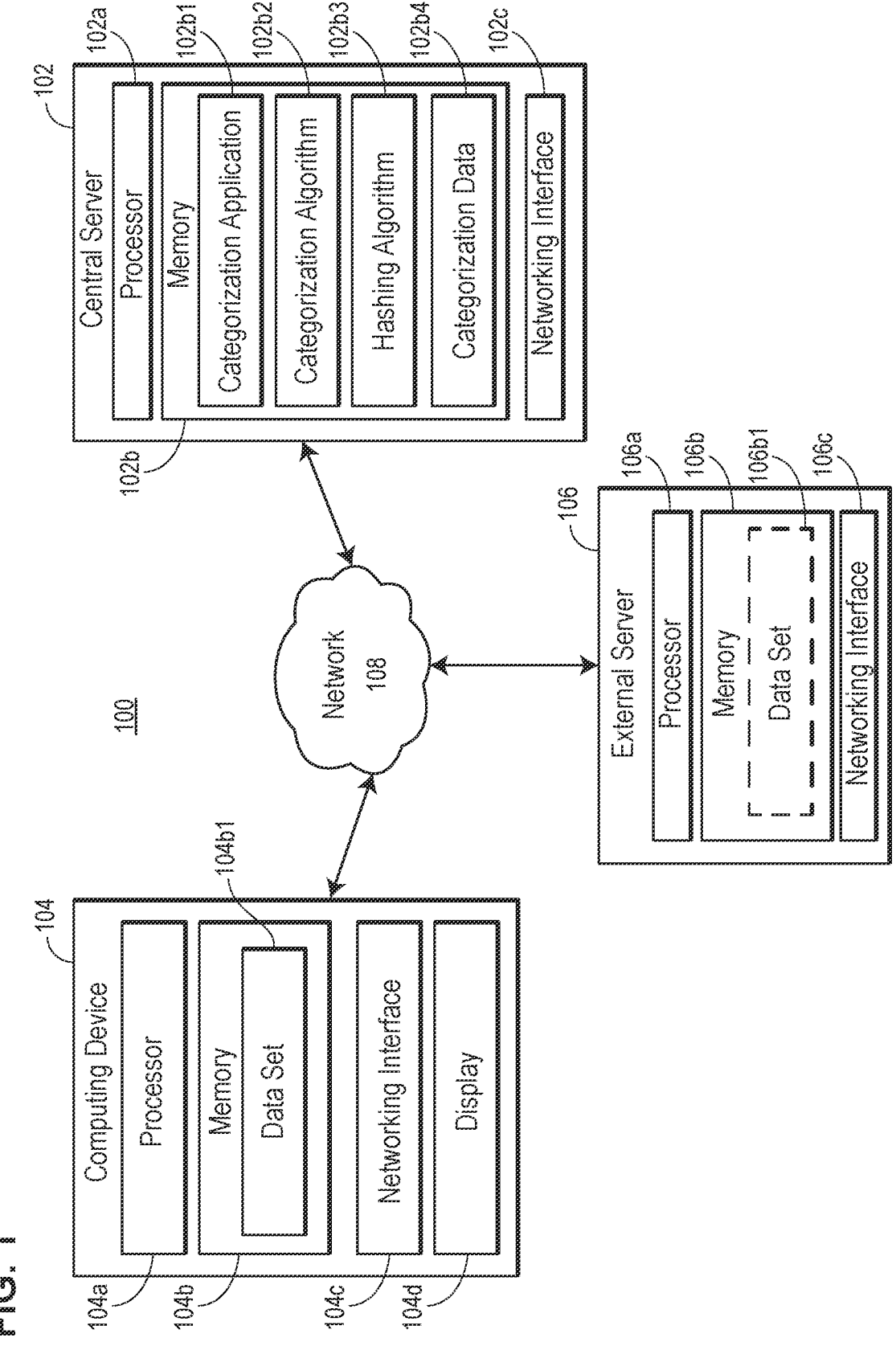
FIG. 1 depicts an example computing system in which various embodiments of the present disclosure may be implemented.

Broadly speaking, the techniques of the present disclosure relate to a categorization algorithm configured to efficiently determine categorizations for large data sets and arbitrarily defined rule groups associated with the large data sets. The data sets described herein include data points that each include at least one data line. Each data line has at least one value to be analyzed in accordance with at least one rule from a rule group. The rule groups include rules for evaluating/analyzing data/values included in the data lines, rule sets to determine categorizations, and optionally, rule hierarchies indicating prioritized ordering(s) of rule sets.

The categorization algorithm is generally configured to determine categorizations for data points based on rule signatures. Data points that have an identical set of applicable rules, rule sets, and rule hierarchies are included as part of the same policy group, and thereby have identical applicable categorizations for data lines included therein. A rule signature is a representation of the rules from the rule group that an individual data line satisfies. Multiple data lines within a data point and/or across multiple data points within a policy group may share identical rule signatures because the multiple data lines each satisfy an identical set of rules from the applicable rule group.

The techniques of the present disclosure categorize data, in part, by determining/generating and utilizing rule signatures that represent fundamental similarities between/among otherwise unrelated and/or dissimilar data lines. This is advantageous as these rule signatures enable the techniques of the present disclosure to quickly and accurately identify all unique categorizations present in the entire data set without evaluating each individual data line against the entire rule group. By contrast, conventional techniques typically evaluate each data line against the entire rule group. Namely, conventional techniques evaluate each data line against each rule of each rule set before determining a highest priority rule set to yield a categorization based on the applicable rule hierarchy. This can lead to massive numbers of redundant calculations that waste processing time/resources.

Data categorization for large data sets typically involves a set of potential categorizations and a rule group that is dwarfed in size by the data set to be categorized, and as a result, many data lines within those data sets ultimately receive identical categorizations. As mentioned, conventional techniques typically perform calculations at an order of magnitude similar to the size of the data set, which for large data sets, can result in billions (or more) of calculations. Such a staggering number of calculations can occupy substantial processing time/resources, and as the data set size increases the processing demands correspondingly increase. Moreover, many of the calculations performed by conventional techniques are necessarily redundant because the set of potential categorizations and applicable rule group are known and finite, such that the analysis performed on many data lines will typically be identical.

Advantageously, the use of rule signatures in the present disclosure substantially reduces these issues experienced by conventional techniques. By leveraging the similarities between/among data lines represented by the rule signatures, the techniques of the present disclosure reduce or eliminate the redundant calculations performed by conventional techniques. More specifically, the rule signatures of the present disclosure ensure that all unique categorizations are determined in parallel across data points without evaluating each data line against the entire rule group. Accordingly, the techniques of the present disclosure can reduce the number of required calculations by several orders of magnitude compared to conventional techniques, with the order/degree of reduction scaling with data set size.

Overall, the data categorization algorithms described herein achieve significant improvements to the processing time required to categorize large data sets. More specifically, the data categorization algorithms described herein categorize data lines by determining and utilizing rule signatures representing similarities between/among data lines to eliminate substantial processing redundancies performed by conventional techniques. The data categorization algorithms described herein thereby can perform a specific manner of parallel processing on large data sets with an efficiency that was previously unachievable with conventional techniques.

In certain embodiments, the techniques of the present disclosure generate and utilize hash values. A hash value generally corresponds to a policy group to which a data point belongs based on the set of rules, rule sets, and rule hierarchies from the rule group that apply to the data point. Similar to the rule signatures, these hash values reduce the processing redundancies experienced by conventional techniques. The hash values enable the techniques of the present disclosure to determine all applicable rules, rule sets, and rule hierarchies for each policy group, and thereafter simultaneously evaluate all data points within each policy group. Conventional techniques generally lack such simultaneous evaluation capabilities, and instead typically evaluate individual data points within individual policy groups. Accordingly, the hash values of the present techniques further enable parallel processing on large data sets that can be significantly more efficient than conventional techniques.

The techniques of the present disclosure thus improve the functionality of a computing device (e.g., a hosting server such as a central server) at least by categorizing data in a particular way to enhance processing efficiency of the computing device. The categorization algorithm, executing on the computing device, utilizes rule signatures to avoid evaluating each data line against an entire rule group, and thereby eliminates significant numbers of redundant calculations otherwise performed by conventional techniques. That is, the present disclosure describes improvements in the functioning of the computer itself because the computing device more efficiently categorizes large data sets as a direct result of the categorization algorithm. This improves over the prior art at least because existing systems typically evaluate each data line against an entire rule group (i.e., perform substantial numbers of redundant calculations) and/or are otherwise unable to categorize large data sets with the efficiency resulting from the categorization algorithm.

Moreover, the present disclosure includes effecting a transformation or reduction of a particular article to a different state or thing, e.g., transforming or reducing the processing demand of a computing system (and associated subsystems/components/devices) from a non-optimal or error state (e.g., highly redundant) to an optimal (or closer to optimal) state by eliminating redundant calculations, and consequently substantially reducing the processing demand conventionally required to categorize large data sets.

Still further, the present disclosure includes specific features other than what is well-understood, routine, conventional activity in the field, or adding unconventional steps that demonstrate, in various embodiments, particular useful applications, e.g., generating a rule signature for each data line in each data point, each rule signature representing at least one rule from the plurality of rules that is satisfied by the data line, identifying a set of unique rule signatures within the generated rule signatures, and/or determining a categorization for each unique rule signature of the set of unique rule signatures based on the unique rule signature and at least one rule set from the plurality of rule sets, among others.

Of course, it should be appreciated that the advantages and technical improvements described above and elsewhere herein are not the only advantages and/or technical improvements that may be realized as a result of the techniques described herein. Other advantages and/or technical improvements to the functioning of a computer itself or other technologies or technical fields may be apparent to one of ordinary skill in the art. Moreover, while described herein primarily in the health care claims context, the techniques described herein may be readily applied in any suitable field for any suitable purpose.

Figure 2A:
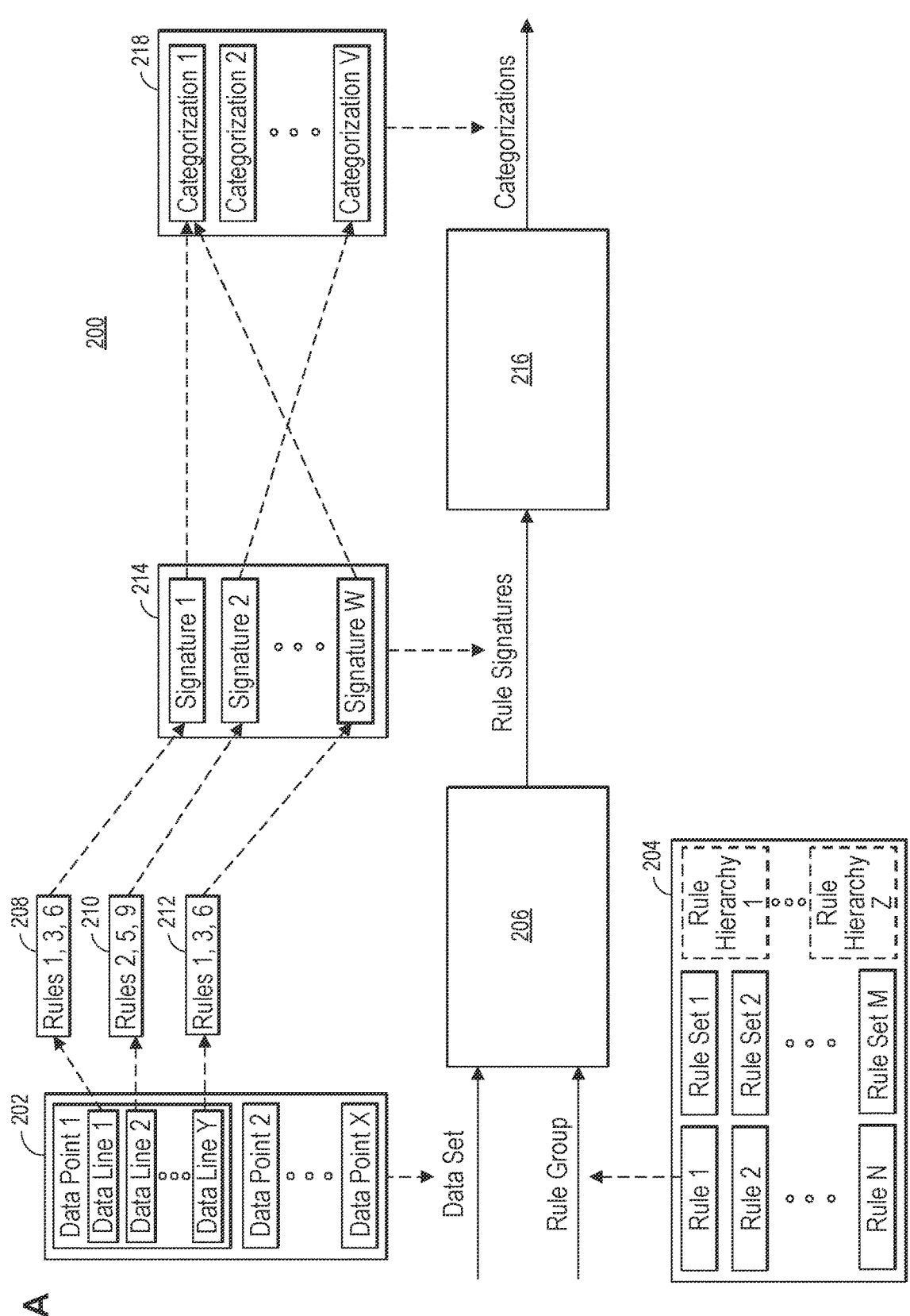
FIG. 2A depicts an example rule signature and categorization determination sequence, in accordance with various embodiments described herein.
Figure 2B:
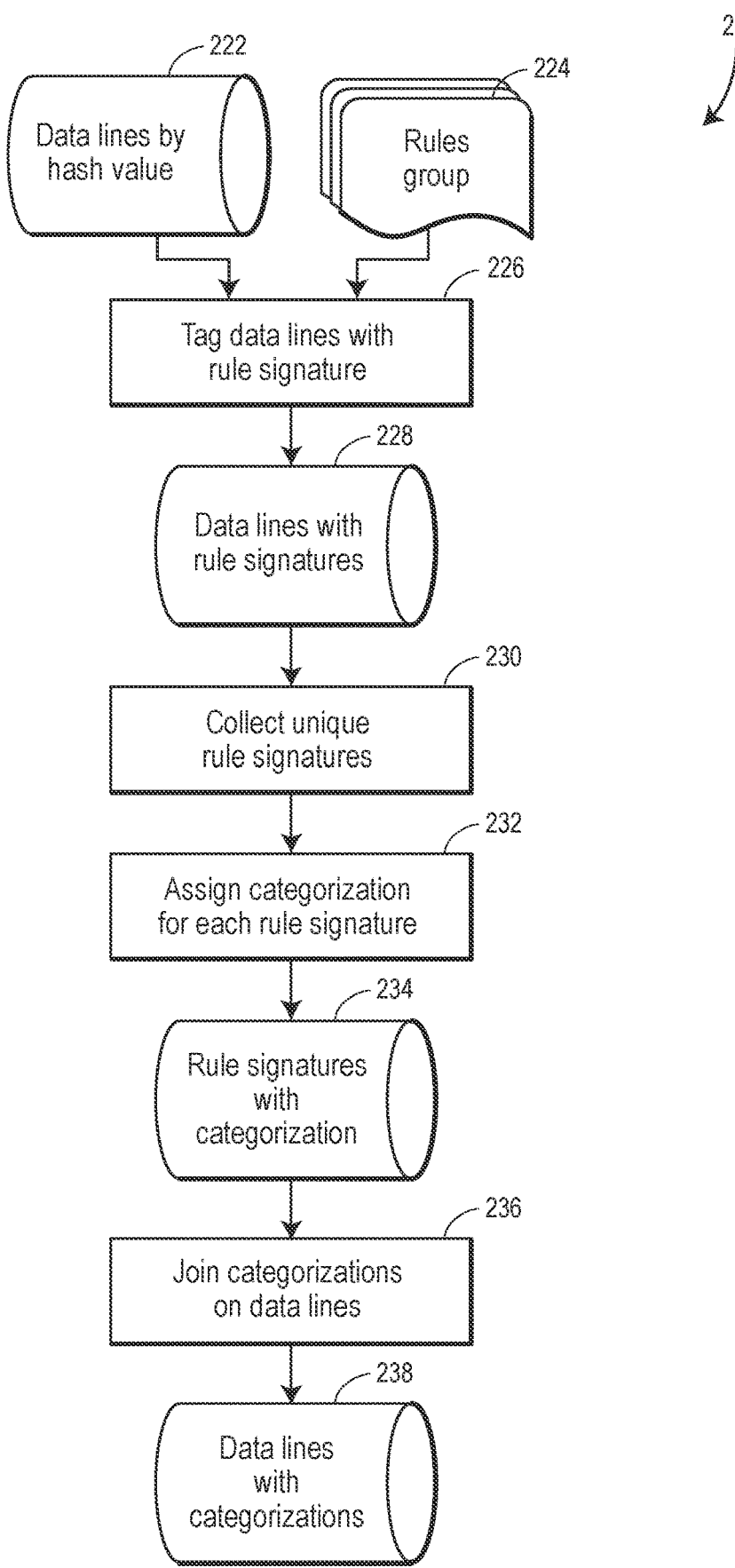
FIG. 2B depicts an example data categorization workflow, in accordance with various embodiments described herein.
Figure 3:
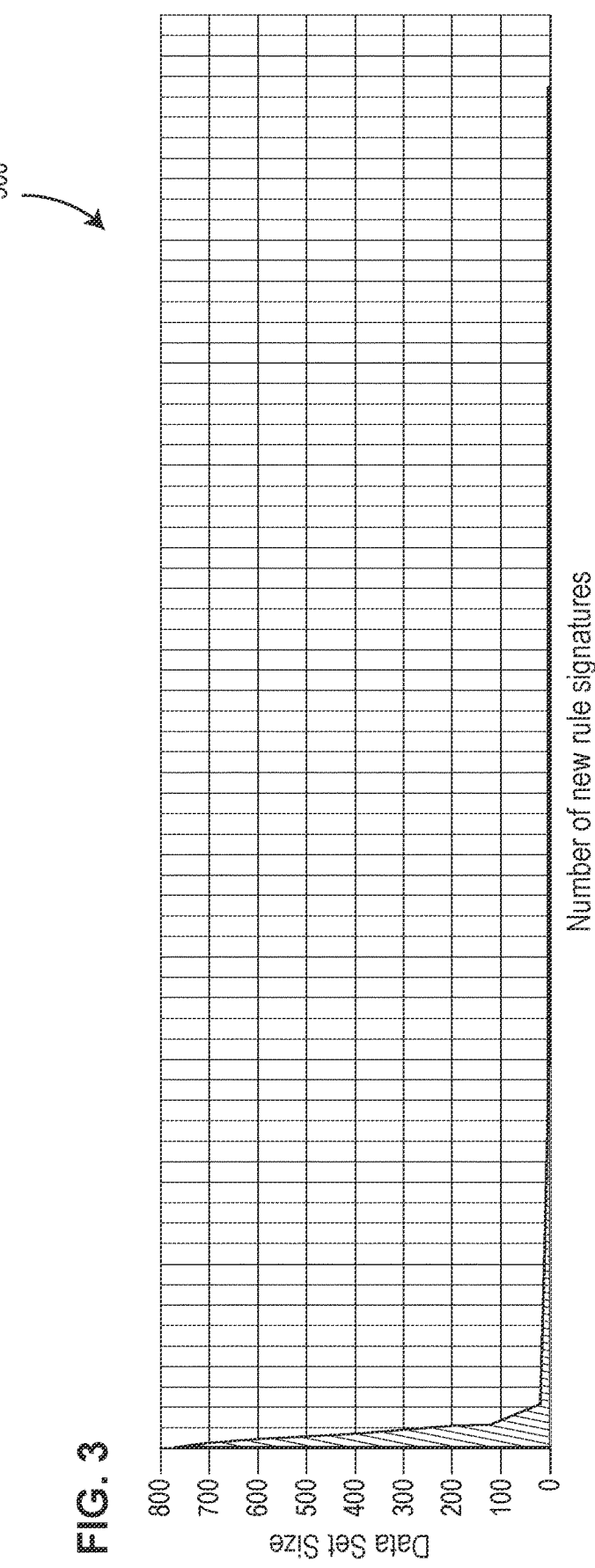
FIG. 3 depicts an example graph representing a distribution of rule signatures based on data set size, in accordance with various embodiments described herein.

To provide a better understanding of the techniques described herein, FIG. 1 depicts an example computing environment in which techniques of the present disclosure may be implemented, and FIGS. 2A and 2B illustrate how some of these system components may interact and/or otherwise process data to generate rule signatures, hash values, determine categorizations, and/or other output. FIG. 3 depicts an example graph illustrating the processing advantages discussed herein. FIG. 4 illustrates an example computer-implemented method for efficient data categorization using rule signatures.

Example Computing System

FIG. 1 depicts an example computing system 100 in which various embodiments of the present disclosure may be implemented. Depending on the embodiment, the example computing system 100 may generate rule signatures, hash values, determine categorizations, and/or any related values or combinations thereof. Of course, it should be appreciated that, while the various components of the example computing system 100 (e.g., central server 102, computing device 104, external server 106, etc.) are illustrated in FIG. 1 as single components, the example computing system 100 may include multiple (e.g., dozens, hundreds, thousands) of computing devices 104 and external servers 106 that are simultaneously connected to the network 108 at any given time.

Generally, the example computing system 100 includes a central server 102, a computing device 104, and an external server 106. The central server 102 includes one or more processors 102a, the memory 102b, and a networking interface 102c. The memory 102b stores executable instructions that are configured to, when executed by the one or more processors 102a, cause the one or more processors 102a to analyze data received at the central server 102 and output various values. The categorization application 102b1, the categorization algorithm 102b2, the hashing algorithm 102b3, and the categorization data 102b4 may all include such executable instructions, as well as other data. The memory 102b may also store additional data and/or databases. It should be appreciated that the central server 102 can include one or multiple computing devices that are co-located or distributed.

The central server 102 receives data set 104b1 from the computing device 104 connected to the server 102 through a network 108 and processes the data set 104b1 in accordance with one or more sets of instructions stored in a memory 102b to output any of the values described herein.

The central server 102 may execute the categorization application 102b1, which in turn, may access and apply the categorization algorithm 102b2, the hashing algorithm 102b3, and/or the categorization data 102b4 to the data set 104b1. The data set 104b1 generally includes a plurality of data points that each include at least one data line. In certain embodiments, the each data point and/or data line is or includes a text string, an audio stream, a video stream, a file, a document, and/or any other suitable data/datatype(s) or combinations thereof. Accordingly, in these embodiments, the data set 104b1 is or includes a set of such text strings, audio streams, video streams, files, documents, and/or any other suitable data/datatype(s) or combinations thereof Generally, the categorization data 102b4 includes rule groups and categorizations the categorization application 102b1 uses to evaluate to the data set 104b1 when executing the categorization algorithm 102b2 and/or the hashing algorithm 102b3. Rule groups generally include rules, rule sets, and/or rule hierarchies that are applicable to groups of policies. Policies generally define the rules, rule sets, and/or rule hierarchies through which any data point associated with the policy will be evaluated. Thus, policies that define identical rules, rule sets, and rule hierarchies are part of the same policy group, and by extension, the data points associated with those policies are evaluated using identical rules, rule sets, and rule hierarchies. In particular, the rule groups included in the categorization data 102b4 include at least one rule and at least one rule set. In certain embodiments, the rule groups also include at least one rule hierarchy.

The categorizations included in the categorization data 102b4 are groupings of related data. For example, categorizations of data lines corresponding to a health care claim document may be or include groupings of related health care services. In this example, a service category of "Adult Preventative Office Visit" may include a physical exam, a diabetes screening, and a cholesterol screening.

Rules included as part of the rule groups in the categorization data 102b4 are a list of potential values that a property of the input (e.g., data from a data line) may take to satisfy the rule. The data line satisfies a rule only if one of the values of the data line matches any value listed in the rule. For example, a first rule is satisfied for a data line if any data line on any co-occurring data point (e.g., health care claim) has a procedure code "99213". As another example, a second rule is satisfied for a data line if the data point includes a Unified Billing form.

Rule sets included as part of the rule groups in the categorization data 102b4 are logical units that calculate a true or false condition based on the condition of a set of rules. For example, a first rule set is satisfied if a data line satisfies a first rule, a second rule set is satisfied if the data line satisfies the first rule but does not satisfy a second rule, a third rule set is satisfied if the data line satisfies the second rule, and a fourth rule set is satisfied if the data line satisfies both the first rule and the second rule. Rule sets may include any suitable number of conditional statements that depend on any suitable number of individual rules.

Rule hierarchies generally indicate a prioritized ordering of the rule sets that apply to any individual data line. Continuing the prior example, the rule hierarchy applying to the data line may indicate that the fourth rule set takes priority over the first, second, and third rule sets, the second rule set takes priority over the first and third rule sets, and the first rule set takes priority over the third rule set. Accordingly, if the data line satisfies the first and second rule sets (i.e., the first and second rule sets calculate a "true" condition for the data line), the categorization application 102*b*1 determines that the second rule set takes priority and applies a categorization corresponding to the second rule set to the data line.

In any event, the categorization application 102*b*1 generates hash values for policies included as part of data sets 104*b*1 when accessing/applying the hashing algorithm 102*b*3 to the data sets 104*b*1 and the categorization data 104*b*4. Hash values generally indicate relevant aspects of policies (e.g., health care policy) as a single value based on the applicable rules for data lines of data points (e.g., health care claims) associated with the policies. Thus, disparate policies (e.g., different health care policies) having an identical hash value share applicable rules for data line categorization. Accordingly, in certain embodiments, hash values represent a subset of rules included in the rule group that are applicable to a policy.

In an example, the data set 104*b*1 includes a policy comprising a health care policy document. The central server 102 receives the data set 104*b*1 and executes the categorization application 102*b*1 to generate a hash value for the health care policy document by accessing/applying the hashing algorithm 102*b*3 to the data set 104*b*1 and the categorization data 102*b*4. By applying the hashing algorithm 102*b*3, the categorization application 102*b*1 determines a subset of the plurality of rules in the rule group that are applicable to the policy and generates a hash value for the policy based on the subset of the plurality of rules. Policies may have thousands of properties for evaluation, such that hashing provides an efficient method to identify policies that belong to identical policy groups. In certain embodiments, the hashing algorithm 102*b*3 is a secure hash algorithm 256-bit (SHA-256) cryptographic hash function configured to convert text into an alphanumeric string of 256 bits. However, the hashing algorithm 102*b*3 may be any suitable hashing algorithm/function.

The categorization application 102*b*1 also receives data sets 104*b*1 and applies the categorization algorithm 102*b*2 to the data sets 104*b*1 and the categorization data 102*b*4 to generate rule signatures and determine categorizations for data lines of the data sets 104*b*1. A rule signature of a data line generally represents at least one rule from the categorization data 102*b*4 that is satisfied by the data line. The rule signature may represent all rules from the categorization data 102*b*4 that are satisfied by the data line. For example, a data line may satisfy rules six, seven, and nine from a plurality of rules included as part of the categorization data 102*b*4. In this example, the categorization application 102*b*1 may access the categorization algorithm 102*b*2 to generate a rule signature for the data line of "R6; R7; R9", representing rules six, seven, and nine that the data line satisfies.

As another example, the data set 104*b*1 may be or include a single data point that is a health care claim document indicating diagnosis codes, medical services, procedure codes, and/or other data associated with treatment of current/past illnesses of a particular individual. In this example, the central server 102 receives the data set 104*b*1 and executes the categorization application 102*b*1 to generate a rule signature for each data line of the health care claim document and categorize each data line in the health care claim document by accessing/applying the categorization algorithm 102*b*2 and the categorization data 102*b*4.

As a more general example, a user/operator accessing the central server 102 (e.g., via computing device 104) may submit/transmit a data set 104*b*1 associated with health care claims and/or other data associated with multiple anonymized patients to the central server 102 for categorization. The categorization application 102*b*1 then receives the data set 104*b*1 and determines whether each data point within the data set 104*b*1 includes, indicates, and/or is otherwise associated with a hash value of a corresponding policy. The data point may include, for example, a policy reference number, name, form type, and/or other identifying information corresponding to the policy that the categorization application 102*b*1 uses to identify an associated policy and hash value within the categorization data 102*b*4. Additionally, or alternatively, the data point may include the relevant hash value when transmitted from the computing device 104 to the central server 102.

If any data point within the data set 104*b*1 does not include, indicate, and/or is otherwise unassociated with a hash value, the categorization application 102*b*1 may stop analyzing the data point because the application 102*b*1 is unable to determine applicable rules for the data point. However, in some embodiments, the categorization application 102*b*1 searches through external data to identify a corresponding policy for the data point. For example, the external server 106 may store data sets 106*b*1 associated with policies, such as health care policy documents outlining terms and conditions of coverage specifying the scope of health care services covered under the policy and member copayment responsibilities. The categorization application 102*b*1 may access the external server 106 to identify a policy indicated by the relevant data point(s), and may generate a hash value for the policy by applying the hashing algorithm 102*b*3 to the policy and rules stored as part of the categorization data 102*b*4.

Regardless, when the categorization application 102*b*1 generates or identifies a hash value for each data point of the data set 104*b*1, the application 102*b*1 then generates a rule signature for each data line of the data points. The categorization application 102*b*1 then identifies (e.g., via the categorization algorithm 102*b*2) a set of unique rule signatures within the generated rule signatures. Continuing the prior example, the categorization application 102*b*1 generates rule signatures for five data lines (e.g., claim lines) from a data point (e.g., a claim) that include: "R2, R4, R5", "R1, R4, R6", "R2, R4, R5", "R3, R4, R6", and "R2, R4, R5". In this example, the rule signature "R2, R4, R5" is represented three times, such that the set of unique rule signatures from these five data lines includes: "R2, R4, R5", "R1, R4, R6", and "R3, R4, R6".

At this point, the categorization application 102*b*1 has a set of unique rule signatures representing rule signatures for each data line of each data point within the data set 104*b*1. Advantageously, the categorization application 102*b*1 does not need to further evaluate the applicable rule sets or rule hierarchy for each data line, but instead can evaluate these rule sets/hierarchies against only the unique rule signatures to determine the relevant categorizations. Namely, when the categorization application 102*b*1 determines the categorizations for each of the unique rule signatures, the application 102*b*1 can apply the categorizations to each data line associated with the unique rule signature. This streamlined categorization determination through the unique rule signatures thereby eliminates the burdensome calculations performed by conventional techniques to evaluate the applicable rule sets and rule hierarchy for each data line.

Generally, the computing device 104 is or includes any device that is associated with (e.g., owned and/or operated by) a particular entity that may provide data (e.g., data set 104*b*1) that is transmitted to and/or is otherwise accessible by the central server 102 and/or the external server 106 through the network 108. In certain embodiments, the data set 104*b*1 transmitted to and/or otherwise accessible by the central server 102 and/or the external server 106 is a large data set including on the order of billions of data lines that each include data/values to be evaluated by the central server 102 and/or the external server 106. In some embodiments, the computing device 104 is a server or collection of servers hosting the data set 104b1. However, in certain embodiments, the computing device 104 is a personal computing device of that entity, such as a smartphone, a tablet, smart glasses, or any other suitable device or combination of devices (e.g., a smart watch plus a smartphone) with wireless communication capability. In the embodiment of FIG. 1, the computing device 104 includes a processor 104a, a memory 104b, a networking interface 104c, and a display 104d. The memory 104b stores the data set 104b1.

The computing device 104 is communicatively coupled to the central server 102 and/or the external server 106. For example, the computing device 104, the central server 102, and/or the external server 106 may communicate via USB, Bluetooth, Wi-Fi Direct, Near Field Communication (NFC), etc. For example, the central server 102 may transmit a categorization indication, a data object indication, and/or any other values, responses, or combinations thereof to the computing device 104 via the networking interface 102c, which the computing device 104 may receive via the networking interface 104c.

The external server 106 may be or include computing servers and/or combinations of multiple servers storing data that may be accessed/retrieved by the central server 102 and/or the computing device 104. In certain embodiments, the external server 106 receives data from the central server 102 and/or the computing device 104 and retrieves/accesses information stored in memory 106b for transmission back to the central server 102 and/or the computing device 104. The external server 106 may include a processor 106a, a memory 106b, and a networking interface 106c. It should be appreciated that the external server 106 can include one or multiple computing devices that are co-located or distributed.

Further, in certain embodiments, the external server 106 includes a data set 106b1 including data from one or both of the computing device 104 and/or the central server 102. In one such example, the external server 106 is a server located in and/or otherwise associated with a hospital or other healthcare provider, and the data set 106b1 includes electronic health records in memory 106b. As another example, the external server 106 serves as a database for some/all of the categorization data 102b4. In some embodiments, the example computing system 100 does not include the external server 106.

Each of the processors 102a, 104a, 106a may include any suitable number of processors and/or processor types. For example, the processors 102a, 104a, 106a may each include one or more CPUs and one or more graphics processing units (GPUs). Generally, each of the processors 102a, 104a, 106a may be configured to execute software instructions stored in each of the corresponding memories 102b, 104b, 106b. The memories 102b, 104b, 106b may each include one or more persistent memories (e.g., a hard drive and/or solid state memory) and may store one or more applications, modules, and/or models, such as the categorization application 102b1.

The networking interface 102c may enable the central server 102 to communicate with the computing device 104, the external server 106, and/or any other suitable devices or combinations thereof. More specifically, the networking interface 102c enables the central server 102 to communicate with each component of the example computing system 100 across the network 108 through their respective networking interfaces 104c, 106c. The networking interfaces 102c, 104c, 106c may support wired or wireless communications, such as USB, Bluetooth, Wi-Fi Direct, Near Field Communication (NFC), etc. The networking interface 102c may enable the central server 102 to communicate with the various components of the example computing system 100 via a wireless communication network such as a fifth-, fourth-, or third-generation cellular network (5G, 4G, or 3G, respectively), a Wi-Fi network (802.11 standards), a WiMAX network, or any other suitable wide area network (WAN), local area network (LAN), or personal area network (PAN), etc.

Moreover, the network 108 may be a single communication network, or may include multiple communication networks of one or more types (e.g., one or more wired and/or PANs or LANs, and/or one or more WANs such as the Internet). In some embodiments, the network 108 includes multiple, entirely distinct networks (e.g., one or more networks for communications between central server 102 and computing device 104, and a separate, Bluetooth or wireless LAN (WLAN) network for communications between central server 102 and computing device 104, and so on).

It will be understood that the above disclosure is one example and does not necessarily describe every possible embodiment. As such, it will be further understood that alternate embodiments may include fewer, alternate, and/or additional steps or elements.

Example Data Categorization Sequences and Workflows

FIG. 2A depicts an example rule signature and categorization determination sequence 200, in accordance with various embodiments described herein. The example rule signature and categorization determination sequence 200 broadly illustrates a rule signature generation stage 206 and a categorization stage 216, which may be performed by central server 102 (e.g., processor 102a and/or other components of central server 102) of FIG. 1, for example. The example rule signature and categorization determination sequence 200 illustrated in FIG. 2A is for the purposes of discussion only, and additional/alternative rule signature generation and/or categorization determination sequences may also, or instead, be utilized.

Initially, the rule signature generation stage 206 receives a data set 202 and a rule group 204. As illustrated in FIG. 2A, the data set 202 includes multiple data points, such as data point 1 and data point 2 through data point X. Each data point included in the data set 202 includes at least one data line. For example, data point 1 includes data line 1 and data line 2 through data line Y. In general, the data set 202 may include any suitable number of data points and the data points may include any suitable number of data lines, such that X and Y may represent any suitable integer values (e.g., 1, 2, 3, etc.).

The rule group 204 includes multiple rules, multiple rule sets, and optionally includes multiple rule hierarchies. The rules include rule 1 and rule 2 through rule N, the rule sets includes rule set 1 and rule set 2 through rule set M, and the rule hierarchies include rule hierarchy 1 through rule hierarchy Z. In general, the rule group 204 may include any suitable number of rules, rule sets, and/or rule hierarchies, such that N, M, and Z may represent any suitable integer values (e.g., 1, 2, 3, etc.).

The rule signature generation stage 206 then includes analyzing the data set and rule group to determine rule signatures for each data line within the data set. As part of this determination, the rule signature generation stage 206 may include generating and/or determining a hash value for each data point included in the data set 202 to then determine applicable rules for each data point.

As an example, the rule group 204 may include rules 1-50, but only some of these rules may apply to each data point included in the data set 202. The rule signature generation stage 206 may determine that the hash value for data point 1 indicates only rules 1-10 apply to data point 1, the hash value for data point 2 indicates only rules 15-35 apply to data point 2, and the hash value for data point X indicates only rules 7-50 apply to data point X. Accordingly, the hash value enables the rule signature generation stage 206 to define the applicable rules for each data point and to subsequently generate rule signatures for each data line.

Generating rule signatures for each data line generally includes the rule signature generation stage 206 evaluating the data lines using the applicable rules to determine a subset of the applicable rules that the data lines satisfy. The rule signature generation stage 206 then generates the rule signatures based on those subsets of applicable rules (i.e., rules the data lines satisfy). The set of rule signatures 214 generated by the rule signature generation stage 206 includes rule signatures 1 through W, wherein W may represent any suitable integer value (e.g., 1, 2, 3, etc.).

For example, the rule signature generation stage 206 includes determining that data line 1 in FIG. 2A satisfies rules 1, 3, and 6 (indicated in block 208) from the rule group 204, such that these rules form the basis of the rule signature (e.g., signature 1 in FIG. 2A) generated for data line 1. The rule signature generation stage 206 further includes determining that data line 2 satisfies rules 2, 5, and 9 (indicated in block 210) from the rule group 204, such that these rules form the basis of the rule signature (e.g., signature 2) generated for data line 2. Still further, the rule signature generation stage 206 includes determining that data line Y satisfies rules 1, 3, and 6 (indicated in block 212) from the rule group 204, such that these rules form the basis of the rule signature (e.g., signature W) generated for data line Y.

The set of rule signatures 214 generally represents the set of all rule signatures generated for the entire set of data lines in all data points of the data set 202. Due to the large size of many data sets, the set of rule signatures 214 likely includes a substantial number of identical rule signatures, where multiple data lines satisfy the same set of rules from the rule group 204. The categorization stage 216 begins by identifying these identical rule signatures and including only a single instance of the identical rule signatures in a set of unique rule signatures.

For example, data line 1 has a corresponding rule signature 1 in the set of rule signatures 214 that represents data line 1 satisfying rules 1, 3, and 6. Data line Y has a corresponding rule signature W in the set of rule signatures 214 that represents data line Y also satisfying rules 1, 3, and 6. More specifically, rule signatures 1 and W are both "R1, R3, R6". Thus, in this example, rule signature 1 and rule signature W are identical. The categorization stage 216 begins by identifying that rule signatures 1 and W are identical and including only a single instance of "R1, R3, R6" in a set of unique rule signatures. Similarly, whenever the categorization stage 216 identifies another instance of the rule signature "R1, R3, R6" within the set of rule signatures, the categorization stage 216 does not include that additional instance in the set of unique rule signatures.

The categorization stage 216 then includes determining categorizations for each unique rule signature included in the set of unique rule signatures. Generally, the categorization stage 216 determines categorizations by applying the applicable rule sets and rule hierarchies from the rule group

204 to the unique rule signatures. Each of the categorizations represented in the set of categorizations 218 corresponds to unique rule signatures from the set of rule signatures 214. Thus, multiple rule signatures in the set of rule signatures 214 may correspond to the same categorization. Continuing the prior example, rule signatures 1 and W are identical, and correspond to the same categorization (e.g., categorization 1). Rule signature 2 is different from rule signatures 1 and W, and corresponds to a different categorization (e.g., categorization V). In certain embodiments, when the categorization stage 216 determines a categorization for a unique rule signature, the categorization stage 216 may also generate/store a data object indicative of the determined categorizations.

In certain embodiments, a central server (e.g., central server 102) stores data objects indicative of the categorizations in memory (e.g., memory 102b). Each data object generally represents an individual data point and may therefore indicate/include categorizations corresponding to each data line within the data point. Additionally, or alternatively, the central server 102 may generate data objects representing categorizations of all data points associated with a particular policy, each data line in a particular data set, and/or any other suitable data referenced herein or combinations thereof. The central server 102 may also generate/ determine additional data using the data objects, cause a computing device (e.g., computing device 104) to display the data objects, reference the data objects to retrieve relevant categorizations, and/or any other suitable action or combinations thereof.

For example, the central server 102 may cause the computing device 104 to transmit a stored data object for review and/or further processing by an entity (e.g., health care insurance provider). In this example, the central server 102 may receive a request from a computing device (e.g., computing device 104) to access categorizations associated with a particular data point (e.g., health care claim). The central server 102 retrieves the relevant data object(s) from memory 102b, and transmits the data object(s) and/or relevant categorizations indicated by the data object(s) to the computing device 104.

FIG. 2B depicts an example data categorization workflow 220, in accordance with various embodiments described herein. Generally, the example data categorization workflow 220 represents the actions performed by a central server (e.g., central server 102) and/or other suitable processing device to determine categorizations of input data sets. More specifically, the example data categorization workflow 220 represents the central server 102 determining data categorizations for received data sets after generating and/or otherwise determining the hash values for the data sets.

As illustrated in FIG. 2B, the example data categorization workflow 220 begins at blocks 222 and 224 with the central server 102 receiving the data set(s) and the associated rule group. As previously discussed, the central server 102 may receive the rule group as part of the data sets or the central server 102 may retrieve the rule group from memory (e.g., categorization data 102b4). With the data sets, the hash values for each data point of the data set, and the rule group, the central server 102 then generates a rule signature for each data line (block 226).

Generally, the central server 102 may initially generate rule signatures across the entire data set simultaneously if both the data points and the rules are preprocessed. This preprocessing can be or include unpivoting or melting the data set and using structure query language (SQL) joins and aggregates to generate the rule signatures efficiently. Further, this preprocessing can be performed by the computing device (e.g., computing device 104) transmitting the data set and/or by a local application (e.g., categorization application 102*b*1) that includes such preprocessing instructions.

Regardless, after generating the rule signatures in these embodiments, the central server 102 then has rule signatures assigned to each data line in the data set (block 228). The central server 102 then identifies the unique rule signatures (block 230) and determines a categorization for each unique rule signature (block 232). Importantly, because each rule signature is generated based on the rules satisfied by the associated data line, each unique rule signature resolves to exactly one categorization per policy group. Thus, the categorization determined for each unique rule signature is necessarily the correct categorization for each data line associated with the unique rule signature.

Accordingly, when the central server 102 has the unique rule signatures with the determined/assigned categorizations (block 234), the server 102 then joins the categorizations with the data lines (block 236) to yield categorized data lines (block 238). In certain embodiments, the central server 102 joins the categorizations with the data lines by generating and storing a data object indicating the categorization associated with the data line. As mentioned, the data object may indicate categorizations associated with any suitable number of data lines, such as indicating categorizations for a data point, an entire data set, and/or all data points within a policy group.

For ease of discussion, the example data categorization workflow 220 assumes all evaluated data lines are part of the same policy group. However, the workflow 220 easily extends to multiple policy group scenarios. In particular, at block 226, the central server 102 generates rule signatures for each data line but does so only using the applicable rules for each policy group. At block 232, the central server 102 evaluates each unique rule signature against the rule sets and rule hierarchy of each policy group to determine the prevailing rule set for each unique signature. At block 236, the central server 102 joins the categorizations back with each data line by rule signature and policy group. Thus, the example data categorization workflow 220 readily applies to multi-policy group scenarios and achieves the same efficiency advantages as a single policy group scenario.

To better understand the efficiency advantages resulting from the techniques of the present disclosure, FIG. 3 depicts an example graph 300 representing a distribution of rule signatures based on data set size, in accordance with various embodiments described herein. The horizontal axis of the example graph 300 is the number of new rule signatures, and the vertical axis is the data set size. As illustrated in FIG. 3, the example graph 300 approximates a logarithmic distribution, whereby the number of new rule signatures appearing in data sets decreases as the data sets increase in size.

This relationship derives naturally from the fact that, for a given set of rules, the possible combinations of those rules are necessarily limited. Moreover, in many practical applications, certain combinations of rules are highly unlikely to apply to an individual data line, such that a substantial number of theoretical combinations may never occur. In a simple example, a policy includes four applicable rules, such that there are only 16 possible unique combinations of those rules that could be satisfied by any individual data line. Thus, as the data set associated with this policy expands to include thousands, millions, billions, etc. of data points, the number of new sets of satisfied rules for an individual data line appearing within the data set will naturally trend towards zero. Of course, the number of possible combinations increases significantly for significantly larger rule sets, but the relationship is fundamentally true.

The techniques of the present disclosure take advantage of this relationship by capturing the similarities between/among all of these redundant sets of satisfied rules in the rule signatures (and more broadly in the hash values). Accordingly, the rule signatures and hash values enable the present techniques to avoid performing millions, billions, etc. of redundant calculations (e.g., applying each rule, rule set, and a rule hierarchy to each data line), and thereby substantially expedite data categorization, as compared to conventional techniques that lack these rule signatures and hash values.
Example Computer-Implemented Methods FIG. 4 depicts a flow diagram representing an example computer-implemented method 400, in accordance with various embodiments described herein. The method 400 may be implemented by one or more processors of the example computing system 100, such as the processor 102*a* of central server 102 (e.g., by categorization application 102*b*1), for example.

The method 400 includes receiving (i) a data set including a plurality of data points and (ii) a rule group including a plurality of rules and a plurality of rule sets (block 402). Each data point in the plurality of data points includes one or more data lines, and all of the one or more data lines for the plurality of data points collectively form a set of data lines. The method 400 further includes applying a categorization algorithm to the data set and the rule group, wherein applying the categorization algorithm includes generating a plurality of rule signatures (block 404). Each rule signature in the plurality of rule signatures is generated for a respective data line in the set of data lines, and each rule signature represents at least one rule from the plurality of rules that is satisfied by the corresponding, respective data line. The method 400 further includes identifying, by the categorization algorithm, a set of unique rule signatures within the plurality of rule signatures (block 406).

The method 400 further includes determining a plurality of categorizations (block 408). Each categorization in the plurality of categorizations is determined for a unique rule signature from the set of unique rule signatures based on the unique rule signature and at least one rule set from the plurality of rule sets. The method 400 further includes storing one or more data objects indicative of the plurality of categorizations (block 410).

In certain embodiments, the method 400 further includes generating a hash value for each policy of a plurality of policies, wherein the hash value represents a subset of the plurality of rules that is applicable to a policy of the plurality of policies, and wherein generating the plurality of rule signatures includes generating each rule signature in the plurality of rule signatures based on the hash value. Further in these embodiments, generating the hash value for each policy includes determining, by a hashing algorithm, subsets of the plurality of rules that are applicable to each policy of the plurality of policies; and generating, by the hashing algorithm, the hash value for each policy of the plurality of policies based on the subsets.

In some embodiments, generating the rule signature for each data line comprises determining a respective subset of the plurality of rules applicable to the respective data line of the set of data lines, and the respective subset of the plurality of rules includes the at least one rule from the plurality of rules that is satisfied by the respective data line.

In certain embodiments, each rule set of the plurality of rule sets corresponds to an outcome of applying at least one rule from the plurality of rules to an individual data line in the set of data lines. Generally, the outcome is a true or false condition resulting from the values of an individual data line satisfying or failing to satisfy the conditions of each rule included as part of a rule set. For example, a rule set corresponding to whether a data line satisfies a rule has a satisfied or unsatisfied condition based on the outcome of applying the rule to the data line (e.g., whether the rule evaluates to true or false when applied to the data line). In some instances, a particular rule set may be satisfied based on whether the data line satisfies or fails to satisfy the applied rule(s).

In some embodiments, the rule group further includes at least one rule hierarchy indicating a prioritized ordering of rule sets from the plurality of rule sets. Further in these embodiments, determining the plurality of categorizations includes analyzing each unique rule signature from the set of unique rule signatures and the at least one rule set from the plurality of rule sets in an order defined by the at least one rule hierarchy.

Of course, it is to be appreciated that the actions of the method 400 may be performed any suitable number of times, and that the actions described in reference to the method 400 may be performed in any suitable order.

EXAMPLES

Example 1. A computer-implemented method comprising: receiving, by one or more processors, (i) a data set including a plurality of data points and (ii) a rule group including a plurality of rules and a plurality of rule sets, wherein each data point in the plurality of data points includes one or more data lines, and wherein all of the one or more data lines in the plurality of data points collectively form a set of data lines; applying, by the one or more processors, a categorization algorithm to the data set and the rule group, wherein applying the categorization algorithm includes: generating a plurality of rule signatures, wherein each rule signature in the plurality of rule signatures is generated for a respective data line in the set of data lines, and wherein the rule signature represents at least one rule from the plurality of rules that is satisfied by the respective data line, identifying a set of unique rule signatures within the plurality of rule signatures, and determining a plurality of categorizations, wherein each categorization in the plurality of categorizations is determined for a unique rule signature from the set of unique rule signatures based on the unique rule signature and at least one rule set from the plurality of rule sets; and storing, by the one or more processors, one or more data objects indicative of the plurality of categorizations.

Example 2. The computer-implemented method of Example 1, further comprising: generating a hash value for each policy of a plurality of policies, wherein the hash value represents a subset of the plurality of rules that is applicable to a policy of the plurality of policies, and wherein generating the plurality of rule signatures includes generating each rule signature in the plurality of rule signatures based on the hash value.

Example 3. The computer-implemented method of Example 2, wherein generating the hash value for each policy comprises: determining, by a hashing algorithm, subsets of the plurality of rules that are applicable to each policy of the plurality of policies; and generating, by the hashing algorithm, the hash value for each policy of the plurality of policies based on the subsets.

Example 4. The computer-implemented method of any of Examples 1 through 3, wherein generating the plurality of rule signatures comprises determining a respective subset of the plurality of rules applicable to the respective data line of the set of data lines, and wherein the respective subset of the plurality of rules includes the at least one rule from the plurality of rules that is satisfied by the respective data line.

Example 5. The computer-implemented method of any of Examples 1 through 4, wherein each rule set of the plurality of rule sets corresponds to an outcome of applying at least one rule from the plurality of rules to an individual data line in the set of data lines.

Example 6. The computer-implemented method of any of Examples 1 through 5, wherein the rule group further includes at least one rule hierarchy indicating a prioritized ordering of rule sets from the plurality of rule sets.

Example 7. The computer-implemented method of Example 6, wherein determining the plurality of categorizations comprises: analyzing each unique rule signature from the set of unique rule signatures and the at least one rule set from the plurality of rule sets in an order defined by the at least one rule hierarchy.

Example 8. A system comprising memory and one or more processors communicatively coupled to the memory, the one or more processors configured to: receive (i) a data set including a plurality of data points and (ii) a rule group including a plurality of rules and a plurality of rule sets, wherein each data point in the plurality of data points includes one or more data lines, and wherein all of the one or more data lines in the plurality of data points collectively form a set of data lines; apply a categorization algorithm to the data set and the rule group, wherein applying the categorization algorithm includes: generating a plurality of rule signatures, wherein each rule signature in the plurality of rule signatures is generated for a respective data line in the set of data lines, and wherein the rule signature represents at least one rule from the plurality of rules that is satisfied by the respective data line, identifying a set of unique rule signatures within the plurality of rule signatures, and determining a plurality of categorizations, wherein each categorization in the plurality of categorizations is determined for a unique rule signature from the set of unique rule signatures based on the unique rule signature and at least one rule set from the plurality of rule sets; and store one or more data objects indicative of the plurality of categorizations.

Example 9. The system of Example 8, wherein the one or more processors are further configured to: generate a hash value for each policy of a plurality of policies, wherein the hash value represents a subset of the plurality of rules that is applicable to a policy of the plurality of policies, and wherein generating the plurality of rule signatures includes generating each rule signature in the plurality of rule signatures based on the hash value.

Example 10. The system of Example 9, wherein the one or more processors are configured to generate the hash value for each policy by: determining, by a hashing algorithm, subsets of the plurality of rules that are applicable to each policy of the plurality of policies; and generating, by the hashing algorithm, the hash value for each policy of the plurality of policies based on the subsets.

Example 11. The system of any of Examples 8 through 10, wherein the one or more processors are configured to generate the plurality of rule signatures by: determining a respective subset of the plurality of rules applicable to the respective data line of the set of data lines, and wherein the respective subset of the plurality of rules includes the at least one rule from the plurality of rules that is satisfied by the respective data line.

Example 12. The system of any of Examples 8 through 11, wherein each rule set of the plurality of rule sets corresponds to an outcome of applying at least one rule from the plurality of rules to an individual data line in the set of data lines.

Example 13. The system of any of Examples 8 through 12, wherein the rule group further includes at least one rule hierarchy indicating a prioritized ordering of rule sets from the plurality of rule sets.

Example 14. The system of Example 13, wherein the one or more processors are configured to determine the plurality of categorizations by: analyzing each unique rule signature from the set of unique rule signatures and the at least one rule set from the plurality of rule sets in an order defined by the at least one rule hierarchy.

Example 15. One or more non-transitory computer-readable storage media including instructions that, when executed by one or more processors, cause the one or more processors to: receive (i) a data set including a plurality of data points and (ii) a rule group including a plurality of rules and a plurality of rule sets, wherein each data point in the plurality of data points includes one or more data lines, and wherein all of the one or more data lines in the plurality of data points collectively form a set of data lines; apply a categorization algorithm to the data set and the rule group, wherein applying the categorization algorithm includes: generating a plurality of rule signatures, wherein each rule signature in the plurality of rule signatures is generated for a respective data line in the set of data lines, and wherein the rule signature represents at least one rule from the plurality of rules that is satisfied by the respective data line, identifying a set of unique rule signatures within the plurality of rule signatures, and determining a plurality of categorizations, wherein each categorization in the plurality of categorizations is determined for a unique rule signature from the set of unique rule signatures based on the unique rule signature and at least one rule set from the plurality of rule sets; and store one or more data objects indicative of the plurality of categorizations.

Example 16. The one or more non-transitory computer-readable storage media of Example 15, wherein the instructions, when executed, cause the one or more processors to: generate a hash value for each policy of a plurality of policies, wherein the hash value represents a subset of the plurality of rules that is applicable to a policy of the plurality of policies, and wherein generating the plurality of rule signatures includes generating each rule signature in the plurality of rule signatures based on the hash value.

Example 17. The one or more non-transitory computer-readable storage media of Example 16, wherein the instructions, when executed, cause the one or more processors to generate the hash value for each policy by: determining, by a hashing algorithm, subsets of the plurality of rules that are applicable to each policy of the plurality of policies; and generating, by the hashing algorithm, the hash value for each policy of the plurality of policies based on the subsets.

Example 18. The one or more non-transitory computer-readable storage media of any of Examples 15 through 17, wherein the instructions, when executed, cause the one or more processors to generate the plurality of rule signatures by: determining a respective subset of the plurality of rules applicable to the respective data line of the set of data lines, and wherein the respective subset of the plurality of rules includes the at least one rule from the plurality of rules that is satisfied by the respective data line.

Example 19. The one or more non-transitory computer-readable storage media of any of Examples 15 through 18, wherein each rule set of the plurality of rule sets corresponds to an outcome of applying at least one rule from the plurality of rules to an individual data line in the set of data lines.

Example 20. The one or more non-transitory computer-readable storage media of any of Examples 15 through 19, wherein the rule group further includes at least one rule hierarchy indicating a prioritized ordering of rule sets from the plurality of rule sets, and the instructions, when executed, cause the one or more processors to determine the plurality of categorizations by: analyzing each unique rule signature from the set of unique rule signatures and the at least one rule set from the plurality of rule sets in an order defined by the at least one rule hierarchy.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method comprising:
   receiving, by one or more processors, (i) a data set including a plurality of data points and (ii) a rule group including a plurality of rules and a plurality of rule sets, wherein each data point in the plurality of data points includes one or more data lines, and wherein all of the one or more data lines in the plurality of data points collectively form a set of data lines;

wherein the rule group further includes at least one rule hierarchy indicating a prioritized ordering of rule sets from the plurality of rule sets;

applying, by the one or more processors, a categorization algorithm to the data set and the rule group, wherein applying the categorization algorithm includes: generating a plurality of rule signatures, wherein each rule signature in the plurality of rule signatures is generated for a respective data line in the set of data lines, and wherein a rule signature in the plurality of rule signatures represents at least one rule from the plurality of rules that is satisfied by the respective data line, identifying a set of unique rule signatures within the plurality of rule signatures, and determining a plurality of categorizations, wherein each categorization in the plurality of categorizations is determined for a unique rule signature from the set of unique rule signatures based on the unique rule signature and at least one rule set from the plurality of rule sets; and analyzing each unique rule signature from the set of unique rule signatures and the at least one rule set from the plurality of rule sets in an order defined by the at least one rule hierarchy;

storing, by the one or more processors, one or more data objects indicative of the plurality of categorizations.

2. The computer-implemented method of claim 1, further comprising:

generating a hash value for each policy of a plurality of policies, wherein the hash value represents a subset of the plurality of rules that is applicable to a policy of the plurality of policies, and wherein generating the plurality of rule signatures includes generating each rule signature in the plurality of rule signatures based on the hash value.

3. The computer-implemented method of claim 2, wherein generating the hash value for each policy comprises:

determining, by a hashing algorithm, subsets of the plurality of rules that are applicable to each policy of the plurality of policies; and generating, by the hashing algorithm, the hash value for each policy of the plurality of policies based on the subsets.

4. The computer-implemented method of claim 1, wherein generating the plurality of rule signatures comprises:

determining a respective subset of the plurality of rules applicable to the respective data line of the set of data lines, and wherein the respective subset of the plurality of rules includes the at least one rule from the plurality of rules that is satisfied by the respective data line.

5. The computer-implemented method of claim 1, wherein each rule set of the plurality of rule sets corresponds to an outcome of applying at least one rule from the plurality of rules to an individual data line in the set of data lines.

6. The computer-implemented method of claim 1, wherein the rule group further includes at least one rule hierarchy indicating a prioritized ordering of rule sets from the plurality of rule sets.

7. The computer-implemented method of claim 6, wherein determining the plurality of categorizations comprises:

analyzing each unique rule signature from the set of unique rule signatures and the at least one rule set from the plurality of rule sets in an order defined by the at least one rule hierarchy.

8. A system comprising memory and one or more processors communicatively coupled to the memory, the one or more processors configured to:

receive (i) a data set including a plurality of data points and (ii) a rule group including a plurality of rules and a plurality of rule sets, wherein each data point in the plurality of data points includes one or more data lines, and wherein all of the one or more data lines in the plurality of data points collectively form a set of data lines;

wherein the rule group further includes at least one rule hierarchy indicating a prioritized ordering of rule sets from the plurality of rule sets;

apply a categorization algorithm to the data set and the rule group, wherein applying the categorization algorithm includes: generating a plurality of rule signatures, wherein each rule signature in the plurality of rule signatures is generated for a respective data line in the set of data lines, and wherein a rule signature in the plurality of rule signatures represents at least one rule from the plurality of rules that is satisfied by the respective data line, identifying a set of unique rule signatures within the plurality of rule signatures, and determining a plurality of categorizations, wherein each categorization in the plurality of categorizations is determined for a unique rule signature from the set of unique rule signatures based on the unique rule signature and at least one rule set from the plurality of rule sets;

analyzing each unique rule signature from the set of unique rule signatures and the at least one rule set from the plurality of rule sets in an order defined by the at least one rule hierarchy; and store one or more data objects indicative of the plurality of categorizations.

9. The system of claim 8, wherein the one or more processors are further configured to:

generate a hash value for each policy of a plurality of policies, wherein the hash value represents a subset of the plurality of rules that is applicable to a policy of the plurality of policies, and wherein generating the plurality of rule signatures includes generating each rule signature in the plurality of rule signatures based on the hash value.

10. The system of claim 9, wherein the one or more processors are configured to generate the hash value for each policy by:

determining, by a hashing algorithm, subsets of the plurality of rules that are applicable to each policy of the plurality of policies; and generating, by the hashing algorithm, the hash value for each policy of the plurality of policies based on the subsets.

11. The system of claim 8, wherein the one or more processors are configured to generate the plurality of rule signatures by:

determining a respective subset of the plurality of rules applicable to the respective data line of the set of data lines, and wherein the respective subset of the plurality of rules includes the at least one rule from the plurality of rules that is satisfied by the respective data line.

12. The system of claim 8, wherein each rule set of the plurality of rule sets corresponds to an outcome of applying at least one rule from the plurality of rules to an individual data line in the set of data lines.

13. The system of claim 8, wherein the rule group further includes at least one rule hierarchy indicating a prioritized ordering of rule sets from the plurality of rule sets.

14. The system of claim 13, wherein the one or more processors are configured to determine the plurality of categorizations by:

analyzing each unique rule signature from the set of unique rule signatures and the at least one rule set from the plurality of rule sets in an order defined by the at least one rule hierarchy.

15. One or more non-transitory computer-readable storage media including instructions that, when executed by one or more processors, cause the one or more processors to:

receive (i) a data set including a plurality of data points and (ii) a rule group including a plurality of rules and a plurality of rule sets, wherein each data point in the plurality of data points includes one or more data lines, and wherein all of the one or more data lines in the plurality of data points collectively form a set of data lines;

wherein each rule set of the plurality of rule sets corresponds to an outcome of applying at least one rule from the plurality of rules to an individual data line in the set of data lines;

apply a categorization algorithm to the data set and the rule group, wherein applying the categorization algorithm includes: generating a plurality of rule signatures, wherein each rule signature in the plurality of rule signatures is generated for a respective data line in the set of data lines, and wherein a rule signature in the plurality of rule signatures represents at least one rule from the plurality of rules that is satisfied by the respective data line, identifying a set of unique rule signatures within the plurality of rule signatures, and determining a plurality of categorizations, wherein each categorization in the plurality of categorizations is determined for a unique rule signature from the set of unique rule signatures based on the unique rule signature and at least one rule set from the plurality of rule sets;

wherein the rule group further includes at least one rule hierarchy indicating a prioritized ordering of rule sets from the plurality of rule sets, and the instructions, when executed, cause the one or more processors to determine the plurality of categorizations by: analyzing each unique rule signature from the set of unique rule signatures and the at least one rule set from the plurality of rule sets in an order defined by the at least one rule hierarchy; and store one or more data objects indicative of the plurality of categorizations.

16. The one or more non-transitory computer-readable storage media of claim 15, wherein the instructions, when executed, cause the one or more processors to:

generate a hash value for each policy of a plurality of policies, wherein the hash value represents a subset of the plurality of rules that is applicable to a policy of the plurality of policies, and wherein generating the plurality of rule signatures includes generating each rule signature in the plurality of rule signatures based on the hash value.

17. The one or more non-transitory computer-readable storage media of claim 16, wherein the instructions, when executed, cause the one or more processors to generate the hash value for each policy by:

determining, by a hashing algorithm, subsets of the plurality of rules that are applicable to each policy of the plurality of policies; and generating, by the hashing algorithm, the hash value for each policy of the plurality of policies based on the subsets.

18. The one or more non-transitory computer-readable storage media of claim 15, wherein the instructions, when executed, cause the one or more processors to generate the plurality of rule signatures by:

determining a respective subset of the plurality of rules applicable to the respective data line of the set of data lines, and wherein the respective subset of the plurality of rules includes the at least one rule from the plurality of rules that is satisfied by the respective data line.

19. The one or more non-transitory computer-readable storage media of claim 15, wherein each rule set of the plurality of rule sets corresponds to an outcome of applying at least one rule from the plurality of rules to an individual data line in the set of data lines.

20. The one or more non-transitory computer-readable storage media of claim 15, wherein the rule group further includes at least one rule hierarchy indicating a prioritized ordering of rule sets from the plurality of rule sets, and the instructions, when executed, cause the one or more processors to determine the plurality of categorizations by:

analyzing each unique rule signature from the set of unique rule signatures and the at least one rule set from the plurality of rule sets in an order defined by the at least one rule hierarchy.

* * * * *